(12) United States Patent
Tashiro (10) Patent No.: US 8,435,348 B2
(45) Date of Patent: May 7, 2013

(54) PAINT BOOTH WITH PURIFIER

(75) Inventor: Minoru Tashiro, Tokyo (JP)

(73) Assignee: Bunri Incorporation, Miyazaki (JP)

( * ) Notice: Subject to any disclaimer, the term of this patent is extended or adjusted under 35 U.S.C. 154(b) by 0 days.

(21) Appl. No.: 13/291,138

(22) Filed: Nov. 8, 2011

(65) Prior Publication Data

US 2012/0048189 A1    Mar. 1, 2012

Related U.S. Application Data

(63) Continuation of application No. PCT/JP2010/057372, filed on Apr. 26, 2010.

(30) Foreign Application Priority Data

May 12, 2009  (JP) .................................. 2009-115828

(51) Int. Cl.
*B05C 11/10*    (2006.01)
(52) U.S. Cl.
USPC ........... 118/600; 118/602; 118/603; 118/610; 118/612
(58) Field of Classification Search .................. 118/600, 118/602, 603, 610, 612
See application file for complete search history.

(56) References Cited

U.S. PATENT DOCUMENTS

| | | | |
|---|---|---|---|
| 2,788,954 A * | 4/1957 | Paasche | 261/5 |
| 3,994,808 A * | 11/1976 | Kearney | 366/348 |
| 4,096,066 A | 6/1978 | Kearney | |
| 5,256,308 A | 10/1993 | Dulany | |
| 5,741,178 A | 4/1998 | Telchuk | |
| 7,395,935 B2 | 7/2008 | Tashiro | |
| 2008/0035554 A1* | 2/2008 | Tashiro | 210/396 |

FOREIGN PATENT DOCUMENTS

| | | |
|---|---|---|
| EP | 0 164 899 A1 | 12/1985 |
| JP | 5420974 | 7/1979 |
| JP | 11285657 | 10/1999 |
| JP | 2002273292 | 9/2002 |
| JP | 3704084 | 7/2005 |
| KR | 100811921 B1 | 3/2008 |

OTHER PUBLICATIONS

International Search Report in PCT/JP2010/057372, Aug. 3, 2010.
Search/Examination Report from Intellectual Property Office of Singapore (IPOS) in Singapore patent application 201108369-8, mailed Sep. 21, 2012 (11 pages).
Extended European Search Report from the EPO issued in corresponding European Application EP 10774822.0, dated Dec. 20, 2012.
Korean Office Action issued in corresponding Korean application KR 2011-7026853, dated Feb. 4, 2013, and English translation thereof.

* cited by examiner

*Primary Examiner* — Marianne L Padgett
*Assistant Examiner* — Stephen Kitt
(74) *Attorney, Agent, or Firm* — Bacon & Thomas, PLLC

(57) ABSTRACT

A paint booth is provided with a purifier. The purifier includes a water tank, pump, water cord formation mechanism, sludge removal mechanism, exhaust mechanism, and barrier member. The water cord formation mechanism includes a water case located in an upper part of a spray chamber. A large number of nozzles are formed in a bottom wall of the water case. Each nozzle includes a tubular portion, the inside diameter of which is reduced downward from an inlet, and a circular outlet. Water falling in straight lines from the outlet forms a large number of parallel water cords. Paint mist is collected as air containing the paint mist contacts the water cords. An exhaust chamber is formed on the back side of the barrier member.

12 Claims, 5 Drawing Sheets

PAINT BOOTH WITH PURIFIER

CROSS REFERENCE TO RELATED APPLICATIONS

This application is a Continuation application of PCT Application No. PCT/JP2010/057372, filed Apr. 26, 2010 and based upon and claiming the benefit of priority from prior Japanese Patent Application No. 2009-115828, filed May 12, 2009, the entire contents of all of which are incorporated herein by reference.

BACKGROUND OF THE INVENTION

1. Field of the Invention

This invention relates to a paint booth with a purifier for removing paint mist contained in air in a spray chamber.

2. Description of the Related Art

A paint booth is used for painting operation by means of a paint sprayer such as a spray nozzle in a spray chamber. The paint booth is used to prevent a working environment in the spray chamber from getting worse or prevent paint mist from being discharged to the outside.

A paint booth of the Venturi booth type is disclosed in, for example, Jpn. Pat. Appln. KOKAI Publication No. 2002-273292 (Patent Document 1). In the paint booth of the Venturi booth type, air containing paint mist is drawn into an eddy chamber by an exhaust fan. The paint mist is separated from airflow by means of centrifugal force of the air produced in the eddy chamber, and the paint mist is collected as it impinges on a water film. The water containing the collected paint mist is returned from a submerged duct to a water tank and reused. The moist air discharged from the eddy chamber is discharged through an exhaust port after it is dehydrated by an eliminator.

On the other hand, a paint booth of the water booth type is disclosed in Japanese Patent No. 3704084 (Patent Document 2). In the paint booth of this type, a water curtain is formed by pouring water drawn up by a pump in the form of a film along a water flow plate. The paint mist is washed away when it contacts the water curtain. Further, shower water is sprayed from shower nozzles arranged on the back side of the water flow plate. By this shower water, the paint mist having failed to be collected by the water curtain is dropped into water.

In either of the paint booths disclosed in Patent Document 1 and Patent Document 2, collected paint mist drops together with water into the water tank and condenses. Therefore, paint sludge (paint residue) is produced in the water tank. This paint sludge collects in the water tank, floating on the water surface or settling in the water tank. Since the conventional paint booths do not comprise a mechanism for purifying water in the water tank, an operator or operators periodically manually remove the paint sludge. However, the periodic cleaning cannot purify contaminated water unless the water is changed. Accordingly, the paint sludge gradually collects in the water tank and solidifies at the bottom of the water tank or near the water surface. Thus, the paint sludge cannot be easily removed and causes contamination of the paint booth.

In the conventional Venturi booth type (Patent Document 1), moreover, a strong negative pressure must be produced to draw up water into the eddy chamber. A large-capacity exhaust fan is needed to attain this, resulting in problems of loud noise, high energy consumption, etc. In the conventional water booth type (Patent Document 2), in contrast, the paint mist contacts only one surface of the water curtain. Therefore, the surface area of the water curtain that can collect the paint mist is small. Thus, the conventional water booth type has a small capacity to collect the paint mist. To increase the collection capacity, a wider water curtain is required, so that the paint booth is enlarged, and a problem of necessity of a large-capacity pump or the like occurs.

BRIEF SUMMARY OF THE INVENTION

Accordingly, the object of the present invention is to provide a paint booth with a high-capacity purifier, capable of efficiently collecting paint mist despite its compactness compared with that of a conventional paint booth.

A paint booth with a purifier according to the present invention comprises a spray chamber accommodating an object to be painted and a purifier for removing paint mist contained in air in the spray chamber. The purifier comprises a water tank disposed in the spray chamber, a pump which draws up water in the water tank, and a water cord formation mechanism. The water cord formation mechanism comprises a water case for accommodating the water drawn up by the pump. The water case comprises a bottom wall formed with a plurality of nozzles, each of the nozzles comprising an inlet, a tubular portion protruding downward from the bottom wall in such a manner that the inside diameter of the tubular portion is reduced downward from the inlet, and a circular outlet opening at the lower end of the tubular portion. The water which drops in straight lines from the outlets forms a plurality of parallel water cords.

The purifier comprises a barrier member, splashguard member, exhaust chamber separated from the spray chamber by the barrier member, exhaust mechanism, and sludge removal mechanism. The barrier member comprises a vertically extending wall portion. The splashguard member is located above a water surface of the water tank and opposite and just below the nozzles and comprises a water receiving surface which declines from an upper end portion in front of the water cords toward a lower end portion near the barrier member. The exhaust mechanism comprises an exhaust fan for discharging the air in the spray chamber to the outside through the exhaust chamber and produces airflow such that the air containing the paint mist in the spray chamber contacts the water cords. The sludge removal mechanism comprises a conveyor disposed in the water tank and discharges paint sludge in the water tank to the outside of the water tank.

According to the present invention, the surface area of the water that can be contacted by the paint mist can be made larger than in a conventional paint booth. Thus, the paint mist can be efficiently collected even if the capacity of the pump is small. Further, the capacity of the exhaust fan can be smaller than in the case of the conventional paint booth of the Venturi booth type or water booth type. This leads to advantages of energy conservation and reduced noise.

The water cord formation mechanism according to the present invention is configured so that a large number of water cords are formed by water continuously dropping in straight lines individually from a large number of nozzles formed in the bottom wall of the water case. These water cords drop straight along the vertical wall portion of the barrier member toward the splashguard member. Even when an operator in the spray chamber is working near the water cords, therefore, an environment can be maintained such that he/she cannot be easily wetted by water. Thus, there is an advantage that the space in the spray chamber can be used effectively. Since the water dropping from the nozzles is received by the splashguard member, moreover, the water surface in the water tank can be prevented from positively undulating. In this purifier, therefore, the paint sludge can easily float on the water surface, and the paint sludge floating on the water surface can be efficiently carried out by the conveyor.

According to one aspect of the present invention, the nozzles of the water cord formation mechanism are formed in, for example, positions corresponding to vertices of equilateral triangles such that distances between the nozzles are equal to one another as viewed from above the water case. However, the nozzles may be arranged in a different way.

According to another aspect of the present invention, moreover, the paint booth comprises a water shedder which is located above the conveyor positioned below the splashguard member and extends along the conveyor. The water shedder comprises a top portion located below a gap between the barrier member and the splashguard member, a first guide surface which declines from the top portion toward one chain of the conveyor, and a second guide surface which declines from the top portion toward the other chain of the conveyor.

An example of the conveyor comprises an upper portion movable near the water surface of the water tank and a lower portion movable near a bottom portion of the water tank. Paint sludge near the water surface is conveyed to a sludge discharge portion outside the water tank by means of the upper portion. An example of the conveyor is movable in a first direction and a second direction opposite to the first direction. When the conveyor moves in the first direction, the paint sludge near the water surface is conveyed toward the sludge discharge portion by the upper portion. When the conveyor moves in the second direction, the paint sludge at the bottom portion of the water tank is conveyed toward the sludge discharge portion by the lower portion. In this case, water surface height maintenance means should preferably be provided for locating the water surface of the water tank at the upper portion of the conveyor.

The sludge removal mechanism comprises, for example, a filter drum, scraping member, and cleaned-fluid tank. The filter drum is disposed for rotation in the water tank and causes the water in the water tank to flow in from the outer peripheral side to the inner peripheral side of the drum, thereby filtering the water in the water tank. The scraping member prevents clogging of the filter drum by contacting the peripheral surfaces of the filter drum. The cleaned-fluid tank introduces the water filtered by the filter drum into the pump.

In some cases, the paint booth may comprise water curtain forming means. The water curtain forming means causes the water to flow along the barrier member, thereby forming a water curtain behind the water cords. Some of the paint mist can be captured by means of the water curtain in a state where the air with the paint mist is contacting with the water curtain.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

One embodiment of the present invention will now be described with reference to FIGS. 1 to 6.

Figure 1:
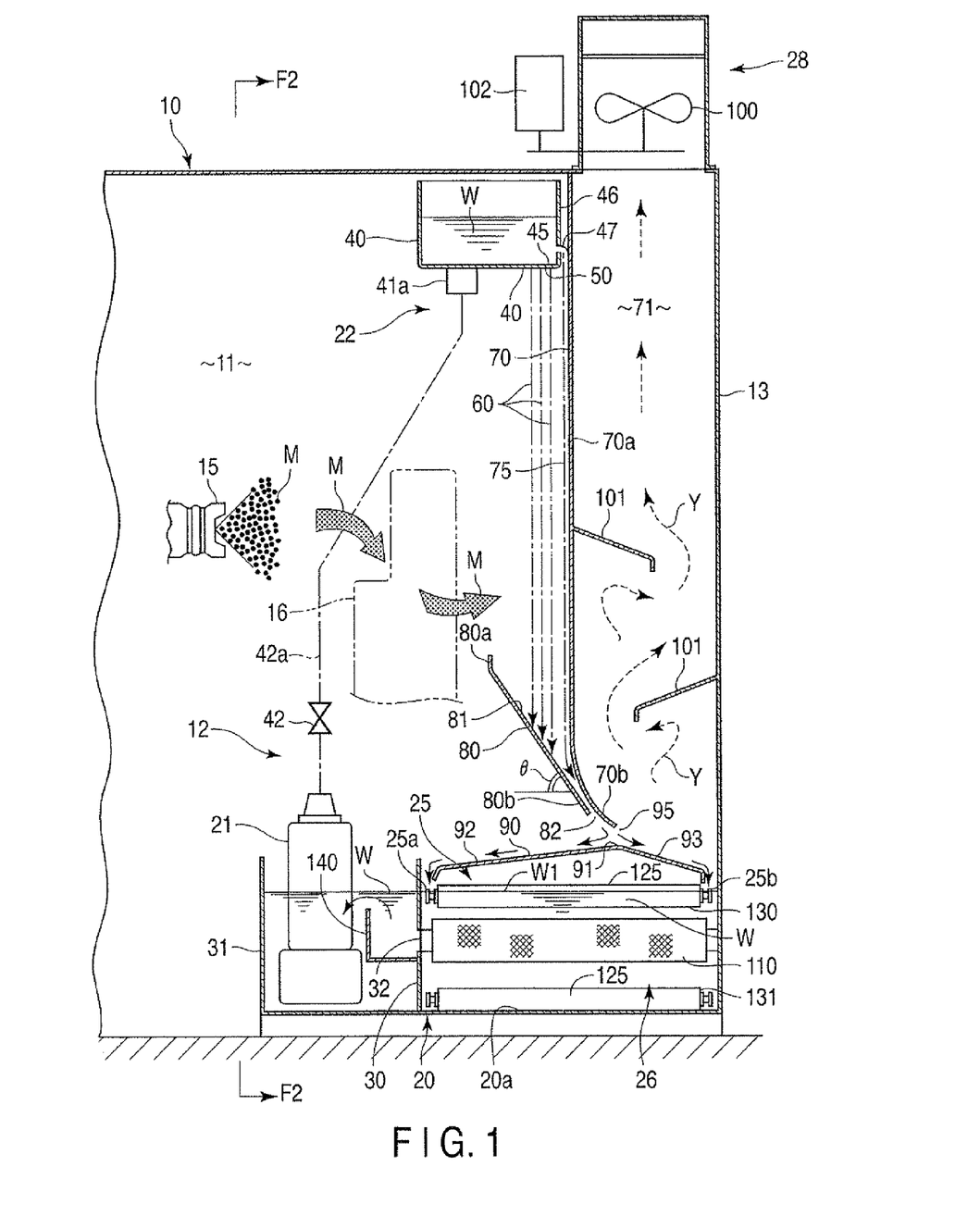
FIG. 1 is a sectional view of a paint booth with a purifier according to one embodiment of the present invention.
Figure 2:
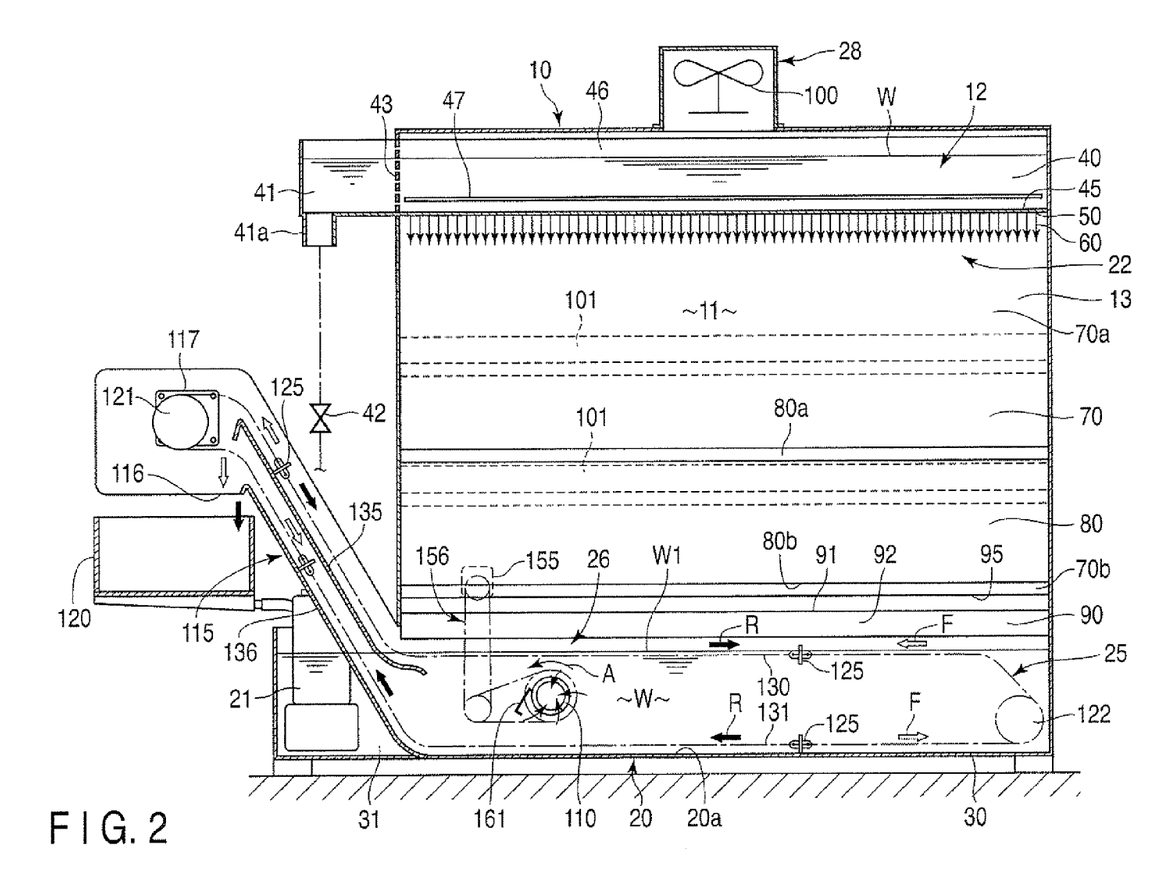
FIG. 2 is a sectional view of the paint booth taken along line F2-F2 in FIG. 1.

FIG. 1 is a vertical sectional view of a paint booth 10. FIG. 2 is a sectional view of the paint booth 10 taken in the direction of arrow F2-F2 in FIG. 1. The paint booth 10 comprises a spray chamber 11, in which paining operation is performed, and a purifier 12. The purifier 12 has the function of removing paint mist M (schematically shown in FIG. 1) produced in the spray chamber 11. The spray chamber 11 is isolated from the external environment by a wall member 13, ceiling member, etc., which are substantially sealed.

When painting operation is performed in the spray chamber 11, a paint sprayer with a spray nozzle 15 and an object 16 to be painted are accommodated in the spray chamber 11. An atomized paint sprayed from the spray nozzle 15 forms the paint mist M. The purifier 12 has the function of removing the paint mist M contained in air in the spray chamber 11. The following is a description of the purifier 12.

The purifier 12 comprises a water tank 20, pump 21, water cord formation mechanism 22, sludge removal mechanism 26 comprising a conveyor 25, exhaust mechanism 28, etc. The water tank 20 is located in a lower part of the spray chamber 11. The pump 21 draws up water W in the water tank 20. The water cord formation mechanism 22, sludge removal mechanism 26, and exhaust mechanism 28 will be described in detail later.

The water tank 20 comprises a tank body 30 accommodating the conveyor 25 and cleaned-fluid tank 31 accommodating filtered water. The cleaned-fluid tank 31 is provided with the pump 21. As shown in FIG. 1, the tank body 30 and cleaned-fluid tank 31 communicate with each other through a flow passage 32.

The water cord formation mechanism 22 comprises a gutter-like water case 40 located above the water tank 20 and a cushion tank 41 located along the water case 40. A water flow suppression member 43 (FIG. 2) formed of a porous plate of, for example, a punching metal is interposed between the water case 40 and cushion tank 41.

The water W drawn up by the pump 21 is introduced into the cushion tank 41 through a piping system 42a, which comprises a valve 42 (FIG. 2), and a cushion tank inlet portion 41a. The water W introduced into the cushion tank 41 flows into the water case 40 through the water flow suppression member 43. The water case 40 and cushion tank 41 is each formed of a metal plate of stainless steel or the like. As shown in FIG. 2, the water case 40 and cushion tank 41 horizontally extend substantially throughout the entire transverse length of the spray chamber 11.

Figure 3:
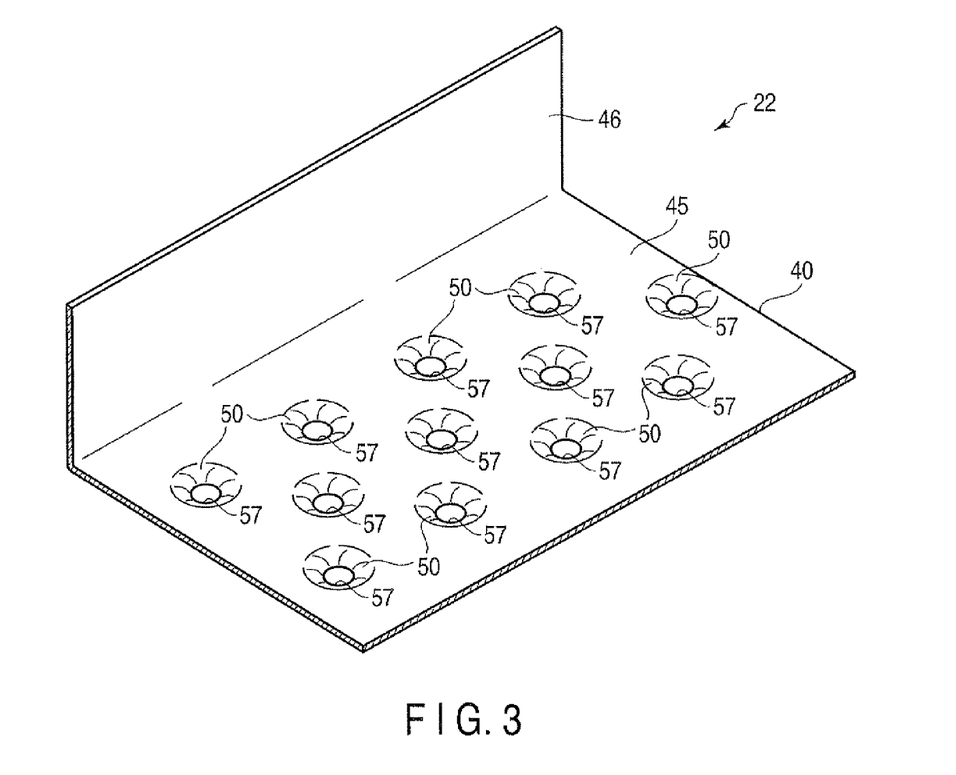
FIG. 3 is a perspective view showing nozzles of a water case used in the paint booth shown in FIG. 1.

FIG. 3 shows a part of the water case 40. The water case 40 comprises a horizontally extending bottom wall 45 and sidewalls 46. The sidewalls 46 extend upward from the side edges of the bottom wall 45. A horizontally extending slit 47 is formed in the sidewall 46. The bottom wall 45 and sidewalls 46 are formed substantially throughout the entire transverse length of the spray chamber 11. A large number of nozzles 50 are formed at regular intervals in the bottom wall 45 of the water case 40.

Figure 4:
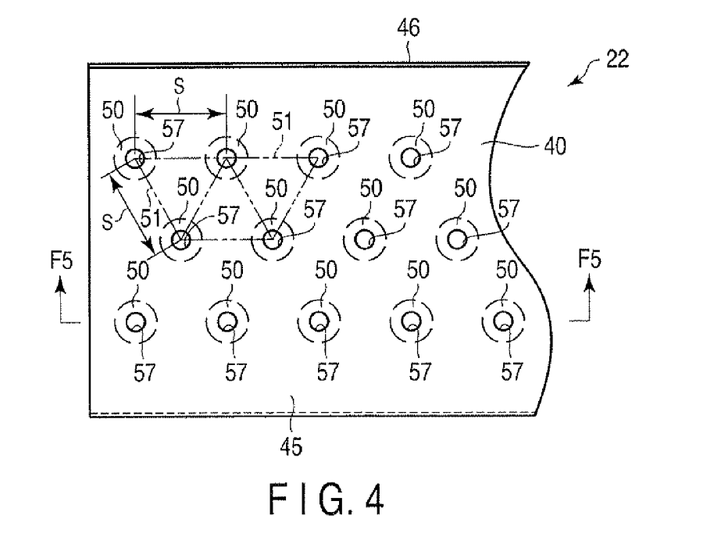
FIG. 4 is a partial plan view of the water case with the nozzles shown in FIG. 3.

FIG. 4 is a top plan view of the bottom wall 45 of the water case 40 comprising the nozzles 50. The nozzles 50 in the bottom wall 45 of the water case 40 are formed in, for example, positions corresponding to vertices (FIG. 4) of equilateral triangles 51 as viewed from above, such that the distances between them are all equal. Thus, distances S between the nozzles 50 are all equal.

The nozzles 50 may be arranged in a way different from that in the embodiment shown in FIG. 4. In short, the nozzles 50 should only be arranged at regular intervals. Although the nozzles 50 are arranged in three rows in the embodiment shown in FIG. 4, they may alternatively be arranged in, for example, two rows or three or more rows. In short, the nozzles 50 should only be arranged in one or more rows.

Figure 5:
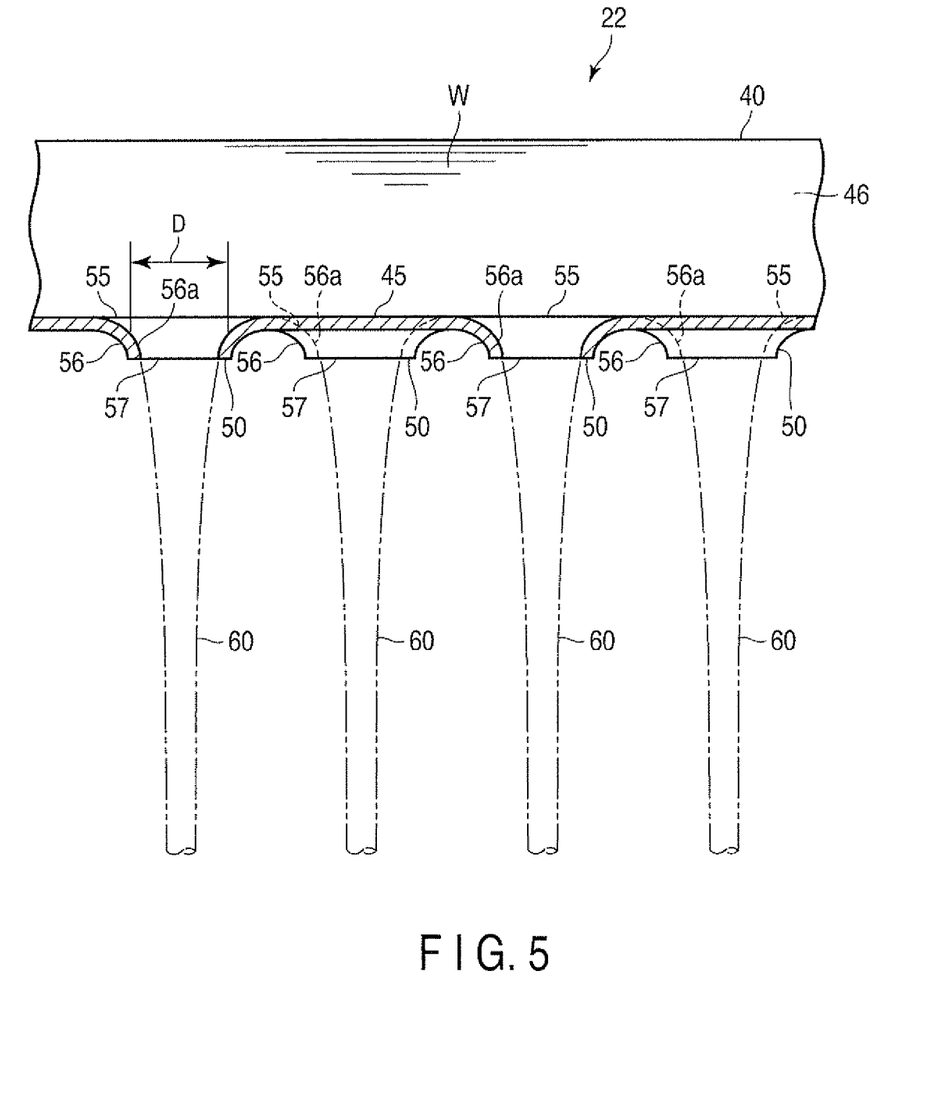
FIG. 5 is a sectional view of the water case with the nozzles taken along line F5-F5 in FIG. 4.

FIG. 5 shows a vertical cross-section of the nozzles 50. As shown in FIG. 5, each nozzle 50 comprises an inlet 55, tubular portion 56 protruding downward from the bottom wall 45, and outlet 57. The inlet 55 opens in the upper surface of the bottom wall 45 of the water case 40. The tubular portion 56 has its inside diameter D reduced downward from the inlet 55 as it extends downward. The outlet 57 opens at the lower end of the tubular portion 56. The inlet 55 and outlet 57 are circular as viewed from above. The inlet 55 and outlet 57 are formed in such a manner that the outlet 57 forms a concentric circle within the inlet 55 as viewed from above.

On the vertical cross-section shown in FIG. 5, an inner peripheral surface 56a of the tubular portion 56 is a smoothly continuously curved surface extending in a circular arc from the inlet 55 to the outlet 57. That part in which the inlet 55 connects with the inner peripheral surface 56a of the tubular portion 56 has a smooth round shape such that flowing water does not cause turbulence. The lower end surface of the tubular portion 56 is finished horizontally flat such that it is free from cracks, distortion, etc., and does not cause turbulence. The nozzles 50 thus shaped can be formed by combining burring, which is a kind of plastic working using a die, with finishing.

As shown in FIG. 5, the water W is introduced onto the bottom wall 45 of the water case 40 with the nozzles 50. The water W flows into the tubular portions 56 through the inlets 55 and further freely drops down through the outlets 57. The water that drops through the respective outlets 57 of the nozzles 50 falls straight downward without causing turbulence. Thus, the water can flow in substantially continuous linear streams, thereby forming cord-like water columns, at least when it is on the way to reach the water tank 20 through the outlets 57. This is the source of the term "water cord (water rope) 60" used herein.

Since the dropping speed increases as the water goes down, the water cords 60 are gradually tapered downward. The tubular portion 56 of each nozzle 50 has a curved surface such that the water flowing therein cannot easily cause turbulence. Accordingly, the water can flow in substantially continuous linear streams until just before it reaches the water tank 20. Thus, the water cords 60 dropping through the respective outlets 57 of the nozzles 50 are kept parallel to one another, and the distances between the dropping water cords 60 are equal to one another. Consequently, a group of water columns, comprising a large number of water cords 60, is formed between the water case 40 and water tank 20 without allowing the water cords 60 to join one another.

A vertically extending barrier member 70 of sheet metal is located in the rear part of the spray chamber 11 (or behind the water cords 60). As shown in FIG. 1, the interior of the paint booth 10 is divided between the spray chamber 11 and an exhaust chamber 71 by the barrier member 70. The barrier member 70 is formed of a metal plate such as stainless steel. The barrier member 70 comprises a wall portion 70a and bent portion 70b. The wall portion 70a vertically extends along the water cords 60. The bent portion 70b is curved from the lower part of the wall portion 70a toward the exhaust chamber 71. As shown in FIG. 2, the barrier member 70 is disposed substantially covering the entire transverse length of the spray chamber 11.

The water drawn up by the pump 21 is introduced into the water case 40. Some of the water introduced into the water case 40 flows out through the slit 47 toward the barrier member 70. The slit 47 is formed in the sidewall 46 of the water case 40. The water having reached the barrier member 70 flows down along the front surface of the wall portion 70a of the barrier member 70. Thereupon, a water curtain 75 of flowing water is formed behind the water cords 60. The slit 47 and wall portion 70a function as water curtain forming means.

A splashguard member 80 of sheet metal is located above a water surface W1 of the water tank 20 and opposite and just below the nozzles 50. The splashguard member 80 is also disposed substantially covering the entire transverse length of the spray chamber 11. As shown in FIG. 1, the splashguard member 80 comprises an upper end portion 80a located in front of the water cords 60, lower end portion 80b located near the barrier member 70, and water receiving surface 81. The water receiving surface 81 is inclined at angle θ such that it declines from the upper end portion 80a of the splashguard member 80 toward the lower end portion 80b.

A slit-like gap 82 is formed between the lower end portion 80b of the splashguard member 80 and the bent portion 70b of the barrier member 70. The gap 82 extends horizontally and is formed substantially throughout the entire transverse length of the spray chamber 11.

A water shedder 90 is located below the splashguard member 80. The water shedder 90 is disposed above the conveyor 25 such that it extends in the moving direction of the conveyor 25. The water shedder 90 is also formed of a metal plate such as stainless steel and disposed substantially covering the entire transverse length of the spray chamber 11.

The water shedder 90 has an upwardly convex shape, and a ridge-like top portion 91 is formed in its highest position. The top portion 91 is located below the gap 82 between the barrier member 70 and splashguard member 80.

As shown in FIG. 1, the water shedder 90 comprises a first guide surface 92 and second guide surface 93. The first guide surface 92 declines from the top portion 91 toward one chain 25a of the conveyor 25. The second guide surface 93 declines from the top portion 91 toward the other chain 25b of the conveyor 25. Thus, the water that drops onto a region near the top portion 91 of the water shedder 90 through the gap 82 is distributed to the first guide surface 92 and second guide surface 93 and introduced to the vicinity of the chains 25a and 25b of the conveyor 25.

A gap 95 is formed between the lower end of the bent portion 70b of the barrier member 70 and the water shedder 90. The gap 95, like the aforementioned gap 82, extends continuously and horizontally and is formed substantially throughout the entire transverse length of the spray chamber 11. The spray chamber 11 and exhaust chamber 71 communicate with each other through the gaps 82 and 95.

The exhaust mechanism 28 comprises the exhaust chamber 71, an exhaust fan 100 located in the upper part of the exhaust chamber 71, eliminators 101 arranged in a plurality of positions in the exhaust chamber 71, etc. The exhaust fan 100 is driven by a motor 102 and discharges air in the spray chamber 11 to the outside through the exhaust chamber 71. This exhaust mechanism 28 has the function of producing an airflow in the spray chamber 11 such that air containing the paint mist in the spray chamber 11 can contact the water cords 60 and water curtain 75.

The following is a description of the sludge removal mechanism 26 with the conveyor 25.

The sludge removal mechanism 26 comprises the conveyor 25 accommodated in the water tank 20, a filter drum 110 located below the water surface W1 of the water tank 20, and the like.

As shown in FIG. 2, a lift portion 115 extending obliquely upward is formed on a side portion of the water tank 20. A sludge discharge portion 116 and motor 117 for driving the conveyor 25 are arranged at the upper part of the lift portion 115. The sludge discharge portion 116 and motor 117 are located higher than the water surface W1 of the water tank 20. A sludge collection box 120 is placed below the sludge discharge portion 116.

The conveyor 25 comprises the chains 25a and 25b (FIG. 1) as an example of wrapped-around transmission members and a plurality of scrapers 125. The scrapers 125 are mounted at predetermined intervals longitudinally relative to the chains 25a and 25b. The conveyor 25 endlessly travels between an upper sprocket 121 and lower sprocket 122. The conveyor 25 that travels between these sprockets 121 and 122 comprises an upper portion (forward-path portion) 130 and lower portion (return-path portion) 131. The upper portion 130 moves along the water surface W1 of the water tank 20. The lower portion 131 moves along a bottom portion 20a of the water tank 20.

The conveyor 25 can be moved in a first direction indicated by arrow F in FIG. 2 and second direction indicated by arrow R, depending on the direction of rotation of the motor 117. The motor 117 is configured so that its direction of rotation is changed for each predetermined time by a control unit (not shown) comprising a timer that functions as switching means. The timing (interval) of the timer for changing the direction is set so that the time for the movement in the first direction F is longer that for the movement in the second direction R. If necessary, moreover, the motor 117 can change the moving direction by means of a manually operable switch.

As shown in FIG. 2, a first guide plate 135 and second guide plate 136 are arranged in the lift portion 115. The first guide plate 135 extends obliquely upward from the tank body 30 toward the sludge discharge portion 116 along the upper portion 130 of the conveyor 25. The second guide plate 136 extends obliquely upward from the bottom portion 20a of the water tank 20 toward the sludge discharge portion 116.

The scrapers 125 of the conveyor 25 are individually in contact with the respective upper surfaces of the guide plates 135 and 136. If the conveyor 25 moves in the first direction F, therefore, paint sludge floating near the water surface W1, along with the scraper 125 at the upper portion 130 of the conveyor 25, moves along the first guide plate 135 toward the sludge discharge portion 116.

When the conveyor 25 moves in the second direction R, paint sludge settled on the bottom portion 20a of the water tank 20 is scraped off by the scraper 125 at the lower portion 131 of the conveyor 25. Accordingly, the paint sludge settled on the bottom portion 20a moves along the second guide plate 136 toward the sludge discharge portion 116.

As shown in FIG. 1, a water level maintenance plate 140 is disposed between the tank body 30 and cleaned-fluid tank 31. The water level maintenance plate 140 functions as water surface height maintenance means for maintaining the water surface height in the water tank 20. The filtered water W filtered through the filter drum 110 flows into the cleaned-fluid tank 31 by overflowing the water level maintenance plate 140. In this way, the position of the water surface W1 of the water tank 20 can be kept at a height such that it can contact the scraper 125 at the upper portion 130 of the conveyor 25.

Figure 6:
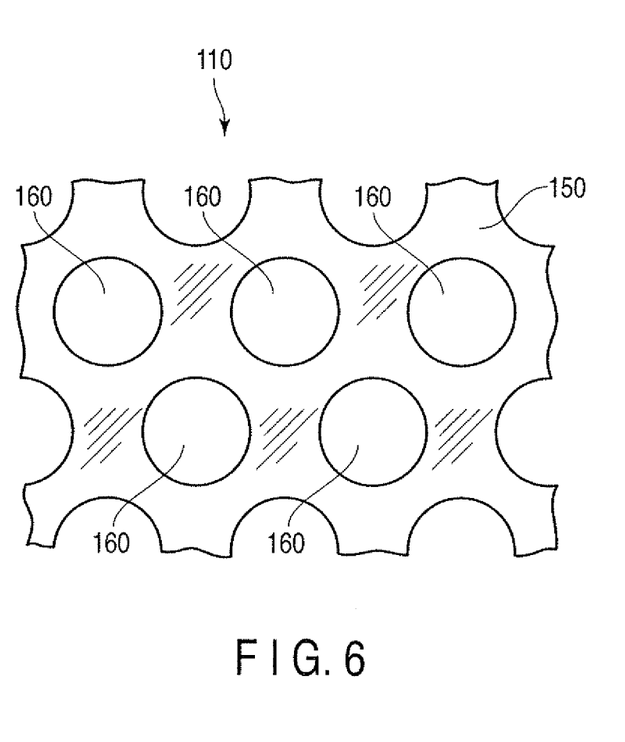
FIG. 6 is a partial plan view of a filter drum used in a sludge removal mechanism of the paint booth shown in FIG. 1.

The filter drum 110 disposed in the water tank 20 is formed of a porous plate 150 (part of which is shown in FIG. 6) that functions as a filter element and is formed cylindrical. This filter drum 110 can rotate about a horizontal axis. In the tank body 30, the filter drum 110 is located between the upper portion 130 and lower portion 131 of the conveyor 25.

The filter drum 110 is rotated in the direction of arrow A shown in FIG. 2 by a filter rotation mechanism 156 that uses a motor 155 as its drive source. As shown in FIG. 6, the porous plate 150 comprises a large number of passage holes 160 formed at a predetermined pitch. The passage holes 160 are formed by for example, etching.

A scraping member 161 (only part of which is shown in FIG. 2) for preventing clogging of the filter drum 110 is in contact with the inner and outer peripheral surfaces of the filter drum 110. Paint sludge scraped off by the scraping member 161 is dropped onto the lower portion 131 of the conveyor 25.

The following is a description of the function of the paint booth 10 with the purifier 12 constructed in this manner.

Water drawn up from the water tank 20 by the pump 21 is introduced into the water case 40 through the cushion tank 41 and water flow suppression member 43. A large number of the water cords 60 are formed as the water in the water case 40 flows out downwardly through the respective outlets 57 of the nozzles 50.

As described before, the water of the water cords 60 hardly diffuses before the water cords having flowed out from the nozzles 50 reach the splashguard member 80. In addition, the dropped water is relatively quietly guided onto the upper surface of the water shedder 90 by the splashguard member 80. Therefore, the water does not splash into the spray chamber 11, so that an operator can avoid being wetted by the water even if he/she is located near the water cords 60. Thus, the space in the spray chamber 11 can be used effectively.

Some of the water W introduced into the water case 40 flows out toward the barrier member 70 through the slit 47 in the sidewall 46 of the water case 40. As this water W flows out downwardly along the barrier member 70, the water curtain 75, a layer of water, is formed on the front side of the barrier member 70. The water dropped on the splashguard member 80 is guided onto the upper surface of the water shedder 90 through the gap 82.

When the exhaust fan 100 is powered, air in the spray chamber 11 is drawn into the exhaust chamber 71 through the gaps 82 and 95, etc., and discharged to the outside of the spray chamber 11. As the air flows in this manner, the paint mist M in the air moves toward the water cords 60 and water curtain 75. The paint mist M in the air is involved and collected by the water cords 60. The paint mist M having failed to be collected is washed away by the water curtain 75. The paint mist M thus washed away flows into the water tank 20 via the splashguard member 80 and the guide surfaces 92 and 93 of the water shedder 90.

In electrodeposition painting, the object 16 to be painted and paint mist M are electrostatically charged with opposite polarities. The paint used is, for example, a water-based cationic electrodeposition paint. In this case, the paint mist M is charged with positive ions. The water cords 60 formed by the purifier 12 of the present embodiment, like waterfalls or showers, produce a large number of negative ions. Accordingly, the paint mist M charged with positive ions can be easily caused to adhere to the water cords 60, so that the paint mist M can be easily collected. Since a large number of negative ions can be produced in the spray chamber 11, moreover, an increase of positive ions due to a causative agent (paint mist M) of air pollution can be suppressed. By the Lenard effect of the negative ions produced in the spray chamber 11, an environment in the spray chamber 11 can be improved to favorably influence the work efficiency, comfort, etc., of the operator who works in the spray chamber 11.

Air that is lifted in the exhaust chamber 71 by the exhaust fan 100 moves in zigzag, impinging on the eliminators 101, for example, as indicated by arrow Y in FIG. 1. In the middle of this lift, water in the air, for example, adheres to the eliminators 101 and drops.

As described above, the paint mist contained in the air in the spray chamber 11 is collected by the water cords 60. The paint mist having failed to be collected is collected by the water curtain 75 behind the water cords 60. The paint mist thus collected drops together with water onto the water receiving surface 81 of the splashguard member 80. The paint mist dropped on the water receiving surface 81 flows into the water tank 20 via the first guide surface 92 and second guide surface 93 of the water shedder 90. The water dropped from the first guide surface 92 and second guide surface 93 is introduced to the vicinity of the chains 25a and 25b of the conveyor 25. Paint sludge adhering to the chains 25a and 25b can be washed away with the water. Thus, the paint sludge can be prevented from undesired adhesion and solidification on the chains 25a and 25b.

Most of the paint sludge introduced into the water tank 20 floats on the water surface W1 of the water tank 20. The paint sludge near the water surface W1 is conveyed to the sludge discharge portion 116 by the scrapers 125 as the conveyor 25 moves in the first direction F. The paint sludge settled on the bottom portion 20a of the water tank 20 is conveyed from the bottom portion 20a of the water tank 20 to the sludge discharge portion 116 by the scrapers 125 as the conveyor 25 moves in the second direction R. Thus, the paint sludge having reached the sludge discharge portion 116 is dropped into the sludge collection box 120.

The water in the water tank 20 is filtered by the filter drum 110. The filtered water W flows into the cleaned-fluid tank 31 through the flow passage 32. The water W in the cleaned-fluid tank 31 is drawn up by the pump 21 and introduced again into the water case 40.

As the filter drum 110 rotates, the paint sludge attracted to the peripheral surface of the filter drum 110 is scraped off by the scraping member 161. The scraped-off sludge is dropped toward the lower portion 131 of the conveyor 25.

According to the paint booth 10 with the purifier 12 of the present embodiment, the water continuously dropping in straight lines from a large number of the nozzles 50 of the water case 40 form a large number of the water cords 60. Thus, the surface area of the water can be larger than that of a conventional simple water curtain. The paint mist is collected by the water cords 60, while the paint mist having failed to be collected is collected by the water curtain 75 behind the water cords 60. Accordingly, the surface area of the water that can be contacted by the paint mist can be made much larger than in a conventional paint booth. Thus, the paint mist can be efficiently collected even if the capacity of the pump 21 is small. Further, the capacity of the exhaust fan 100 can be smaller than in the case of a conventional paint booth of the Venturi booth type or water booth type. The small capacity of the exhaust fan 100 leads to advantages of energy conservation and reduced noise.

Since the water (water cords 60) dropping from the nozzles 50 is received by the water receiving surface 81 of the splashguard member 80, moreover, the water surface W1 in the water tank 20 can be prevented from positively undulating. Thus, the paint sludge can easily float on the water surface W1, and the paint sludge floating on the water surface W1 can be efficiently carried out by the conveyor 25.

The movement of the conveyor 25 can be switched between the first direction F and second direction R. The paint sludge floating on the water surface W1 can be removed by the upper portion 130 of the conveyor 25 while the conveyor 25 is moving in the first direction F. The paint sludge settled on the bottom portion 20a of the water tank 20 can be removed by the lower portion 131 of the conveyor 25 while the conveyor 25 is moving in the second direction R. Thus, the paint sludge in the water tank 20 can be removed at an early stage, so that solidification of the paint sludge in the water tank 20 can be prevented. Thereupon, clean water purified by the filter drum 110 can be recycled by means of the pump 21.

This invention is applicable to a paint booth in which paint mist is produced. It is to be understood, in carrying out the present invention, that the constituent elements of the paint booth with the purifier, including the barrier member, splashguard member, pump, exhaust mechanism, sludge removal mechanism, etc., as well as the water cord formation mechanism, may be embodied in various forms without departing from the spirit of the invention. Further, specific forms, such as the shape and layout of the nozzles, are not limited to the embodiment described above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A paint booth which comprises a spray chamber accommodating an object to be painted and a purifier for removing paint mist contained in air in the spray chamber, the purifier comprising:

a water tank disposed in the spray chamber;

a pump which draws up water in the water tank;

a water cord formation mechanism comprising a water case for accommodating the water drawn up by the pump, the water case comprising a bottom wall formed with a plurality of nozzles, each of the nozzles comprising an inlet, a tubular portion protruding downward from the bottom wall in such a manner that the inside diameter of the tubular portion is reduced downward from the inlet, and a circular outlet opening at the lower end of the tubular portion, the water which drops in straight lines from the outlets forming a plurality of parallel water cords;

a barrier member comprising a vertically extending wall portion;

a splashguard member located above a water surface of the water tank and opposite and just below the nozzles and comprising a water receiving surface which declines from an upper end portion in front of the water cords toward a lower end portion near the barrier member;

an exhaust chamber separated from the spray chamber by the barrier member;

an exhaust mechanism comprising an exhaust fan for discharging the air in the spray chamber to the outside through the exhaust chamber, the exhaust mechanism being configured to produce airflow such that the air containing the paint mist in the spray chamber contacts the water cords;

a sludge removal mechanism comprising a conveyor disposed in the water tank and configured to discharge paint sludge floating near the water surface in the water tank to the outside of the water tank, the conveyor having first and second chains and scrapers mounted on the first and second chains, a water shedder which is located above the conveyor positioned below the splashguard member and extends along the first and second chains of the conveyor, the water shedder comprising a top portion which is located below a gap between the barrier member and the splashguard member, a first guide surface which declines from the top portion toward the first chain, a first lower edge which is located above the first chain and extending along the first chain and configured to drop water from the first guide surface into a vicinity of the first chain, a second guide surface which declines from the top portion toward the second chain, and a second lower edge which is located above the second chain and extending along the second chain and configured to drop water from the second guide surface into a vicinity of the second chain, wherein the first and second guide surfaces are configured to direct the drop water in separate directions.

2. The paint booth with a purifier of claim 1, wherein the nozzles of the water cord formation mechanism are arranged so that distances between the nozzles are equal to one another as viewed from above the water case.

3. The paint booth with a purifier of claim 1, wherein the conveyor comprises an upper portion movable near the water surface of the water tank and a lower portion movable near a bottom portion of the water tank and conveys paint sludge near the water surface to a sludge discharge portion outside the water tank by means of the upper portion.

4. The paint booth with a purifier of claim 2, wherein the conveyor comprises an upper portion movable near the water surface of the water tank and a lower portion movable near a bottom portion of the water tank and conveys paint sludge near the water surface to a sludge discharge portion outside the water tank by means of the upper portion.

5. The paint booth with a purifier of claim 3, wherein the conveyor is movable in a first direction and a second direction opposite to the first direction such that the paint sludge near the water surface is conveyed toward the sludge discharge portion by the upper portion of the conveyor when the conveyor moves in the first direction and that the paint sludge at the bottom portion of the water tank is conveyed toward the sludge discharge portion by the lower portion of the conveyor when the conveyor moves in the second direction.

6. The paint booth with a purifier of claim 4, wherein the conveyor is movable in a first direction and a second direction opposite to the first direction such that the paint sludge near the water surface is conveyed toward the sludge discharge portion by the upper portion of the conveyor when the conveyor moves in the first direction and that the paint sludge at the bottom portion of the water tank is conveyed toward the sludge discharge portion by the lower portion of the conveyor when the conveyor moves in the second direction.

7. The paint booth with a purifier of claim 3, comprising water surface height maintenance means for locating the water surface of the water tank at the upper portion of the conveyor.

8. The paint booth with a purifier of claim 4, comprising water surface height maintenance means for locating the water surface of the water tank at the upper portion of the conveyor.

9. The paint booth with a purifier of claim 5, comprising water surface height maintenance means for locating the water surface of the water tank at the upper portion of the conveyor.

10. The paint booth with a purifier of claim 6, comprising water surface height maintenance means for locating the water surface of the water tank at the upper portion of the conveyor.

11. The paint booth with a purifier of claim 1, wherein the sludge removal mechanism comprises a filter drum disposed for rotation in the water tank and configured to cause the water in the water tank to flow in from the outer peripheral side to the inner peripheral side, thereby filtering the water in the water tank, a scraping member configured to prevent clogging of the filter drum by contacting the peripheral surfaces of the filter drum, and a cleaned-fluid tank which introduces the water filtered by the filter drum into the pump.

12. The paint booth with a purifier of claim 1, comprising water curtain forming means which causes the water drawn up by the pump to flow down along the front surface of the wall portion of the barrier member, thereby forming a water curtain behind the water cords.

\* \* \* \* \*